(12) United States Patent
Vadassery et al.

(10) Patent No.: US 10,691,933 B2
(45) Date of Patent: Jun. 23, 2020

(54) USING CLOSED CIRCUIT CAMERAS FOR EMERGENCY SERVICES

(71) Applicant: CA, Inc., New York, NY (US)

(72) Inventors: Lyju Vadassery, Mumbai (IN); Vijay Shashikant Kulkarni, Karnataka (IN); Vikrant Nandakumar, Karnataka (IN); Adila Parveen Hafeezulla, Karnataka (IN); Subhashini Bysani, Karnataka (IN); Sri Venkata Vijaya Lakshmi Tholeti, Karnataka (IN)

(73) Assignee: CA, Inc., New York, NY (US)

(*) Notice: Subject to any disclaimer, the term of this patent is extended or adjusted under 35 U.S.C. 154(b) by 100 days.

(21) Appl. No.: 16/123,490

(22) Filed: Sep. 6, 2018

(65) Prior Publication Data
US 2020/0082164 A1    Mar. 12, 2020

(51) Int. Cl.
*G06K 9/00* (2006.01)
*G06F 3/01* (2006.01)
*H04N 5/247* (2006.01)
*G08B 25/00* (2006.01)
*G06T 7/20* (2017.01)
*H04N 7/18* (2006.01)

(52) U.S. Cl.
CPC ......... *G06K 9/00355* (2013.01); *G06F 3/017* (2013.01); *G06T 7/20* (2013.01); *G08B 25/006* (2013.01); *H04N 5/247* (2013.01); *H04N 7/181* (2013.01)

(58) Field of Classification Search
CPC ....... G06K 9/00355; G06F 3/017; G06T 7/20; G08B 25/006; H04N 5/247; H04N 7/181
See application file for complete search history.

(56) References Cited

U.S. PATENT DOCUMENTS

| | | | |
|---|---|---|---|
| 2015/0347910 A1* | 12/2015 | Fadell | H05B 47/10 706/46 |
| 2016/0042767 A1* | 2/2016 | Araya | G11B 19/02 386/201 |
| 2016/0119424 A1* | 4/2016 | Kane | G08B 27/001 709/203 |

* cited by examiner

*Primary Examiner* — Ping Y Hsieh
(74) *Attorney, Agent, or Firm* — Shook, Hardy & Bacon L.L.P.

(57) ABSTRACT

Method by a computer of a computing system having a plurality of camera sensors and a camera sensor control system is provided. A gesture input event is identified that is detected by a camera sensor of the camera sensors. Each camera sensor routes video captured by the camera sensor to a data storage system. The first gesture input event is identified as corresponding to a defined attention-based gesture performed by a user. A time the first gesture input event was identified is determined. Video stored in the data storage system is fetched using the time that is determined as a pointer. An indication of the first gesture input event and the video that is fetched is transmitted towards an emergency call center (ECC). A trigger word or sound may be detected, and an indication of the trigger word or sound may be transmitted towards the ECC.

20 Claims, 9 Drawing Sheets

USING CLOSED CIRCUIT CAMERAS FOR EMERGENCY SERVICES

FIELD

Some embodiments described herein relate to emergencies, and in particular to requesting emergency services using camera audio/visual sensors.

BACKGROUND

Typically, landline phones or cellular phones are used to request emergency services from emergency services providers such as fire departments, ambulances, police, etc. In most instances, users can call and obtain the required services.

However, cell phone reception may be limited in remote locations, crowded locations, etc. and certain emergencies may make locating and/or operating an emergency landline more difficult. For example, when college or professional sporting events such as football games, basketball games, soccer games, etc. are taking place, cellular phone service may be overwhelmed by the number of users at these locations and landline phones may not be available. In such instances, users are not able to contact emergency services.

Further, both cell phones and landlines are typically unable to identify the caller through a photo identification process. Moreover, cell phone and landline calls to emergency services typically require a potentially burdensome amount of time with regards to explaining the situation, service needed, location, and so forth.

SUMMARY

Some embodiments are directed to a method by a computer of a computing system having a plurality of camera sensors to identify a first gesture input event detected by a camera sensor of the plurality of camera sensors. Each camera sensor routes video captured by the camera sensor to a data storage system. The first gesture input event is identified as corresponding to a defined attention-based gesture performed by a user. A time the first gesture input was identified is determined. Video stored in the data storage system is fetched using the time that is determined as a pointer. An indication of the first gesture input event and the video that is fetched is transmitted towards an emergency call center.

In some embodiments, the computer system communicates a list of emergency service options to be displayed by a display device that is located at a location the user can see. The list comprises a plurality of emergency types, wherein each emergency type corresponds to different one of a plurality of service-selection gestures and the first gesture input event corresponds to the user performing one of the plurality of service-selection gestures. A second gesture input event is identified responsive to the user performing another one of the service-selection gestures. In some embodiments, different gesture input events are identified as having performed by a user showing different numbers of fingers to the camera sensor. Responsive to identifying the second gesture input event, an indication of the second gesture input event is sent to the emergency call center.

In some embodiments, the camera sensor comprises a microphone and a speaker. Audio from the emergency call center is received and output through the speaker of the camera sensor. An audio response via the microphone from the user is received. The audio response is routed to the emergency call center.

Corresponding camera sensor control systems in communication with a plurality of camera sensors and an emergency call center are disclosed. In some embodiments, the camera sensor control system includes a communication interface and a processor coupled to the communication interface and to memory, wherein the memory stores computer program instructions that are executed by the processor to perform operations comprising identifying a gesture input event in video detected by a camera sensor of the plurality of camera sensors, the gesture input event being identified as corresponding to a defined attention-based gesture from a user. The operations further comprise determining a time the gesture input event was identified. The operations further comprise fetching video stored in a data storage system using the time that is determined as a pointer and transmitting, via the communication interface though a network, an indication of the gesture input event and the video that is fetched towards an emergency call center.

The operations of the camera sensor control system may further include detecting one of a trigger word or a trigger sound. These operations may further include determining a direction from which the one of the trigger word or the trigger sound traveled and directing the camera sensor to move a camera of the camera sensor towards the direction.

The operations of the camera sensor control system to determine movement of the user may further include tracking, using image recognition, the user from stored video of the camera sensor starting at the time the gesture input event was identified to a first time that the user appears in the stored video of the camera sensor. The operations may further include determining a second camera sensor of the plurality of camera sensors based on a location of the user at the first time that user appears. Fetching the video may include fetching video from the data storage system for the camera sensor and the second camera sensor based on the time span and using the time the gesture input event was identified as a pointer.

It is noted that aspects of the inventive concepts described with respect to one embodiment may be incorporated in different embodiments although not specifically described relative thereto. That is, all embodiments or features of any embodiments can be combined in any way and/or combination. These and other objects or aspects of the present inventive concepts are explained in detail in the specification set forth below.

Advantages that may be provided by various of the concepts disclosed herein include transmitting an indication that emergency services are needed when cellular service is overwhelmed by the number of uses at particular locations, reducing the time to contact emergency services, enabling contact of emergency services by users who do not have wireless devices, fetching and providing video associated with the time a gesture event is identified that emergency services are needed, and transmitting an indication that emergency services responsive to identifying trigger words or trigger sounds. The advantages result in improved automated identification of an event that requires an emergency service.

Other methods, devices, and computer program products, and advantages will be or become apparent to one with skill in the art upon review of the following drawings and detailed description. It is intended that all such additional systems, methods, or computer program products and advantages be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Embodiments of the present inventive concepts now will be described more fully hereinafter with reference to the accompanying drawings. Throughout the drawings, the same reference numbers are used for similar or corresponding elements. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide methods or a camera sensor control system for transmitting an indication of a gesture input event and video associated with the gesture input event. According to some embodiments, a camera sensor control system identifies a gesture input event in video detected by a camera sensor of the plurality of camera sensors, the gesture input event being identified as corresponding to a defined attention-based gesture from a user. The camera sensor control system determines a time the gesture input event was identified. The camera sensor control system fetches video stored in a data storage system using the time that is determined as a pointer. The camera sensor control system transmits, via a communication interface though a network, an indication of the gesture input event and the video that is fetched towards an emergency call center.

Figure 1:
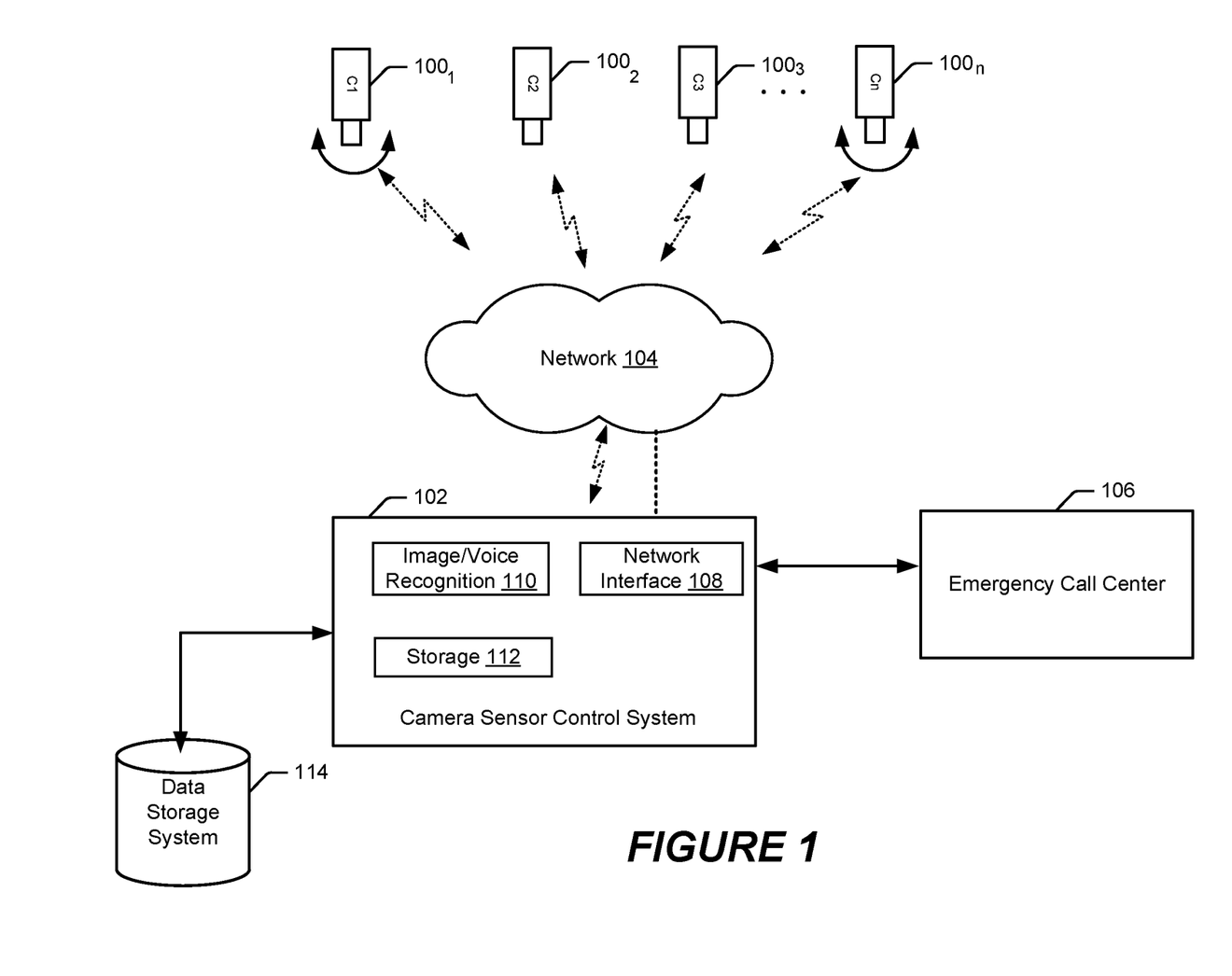
FIG. 1 is a block diagram illustrating an exemplary environment of a camera sensor control system communicating with camera sensors and an emergency call center according to some embodiments.

FIG. 1 is a block diagram illustrating an environment of a camera sensor control system communicating with camera sensors and an emergency call center according to an embodiment. As shown, camera audio/visual (A/V) sensors $100_1$, $100_2$, $100_3$, . . . $100_n$ provide video in real-time to a camera sensor control system 102 via network 104. Network 104 may be a wireless network (e.g., a wireless local area network (WLAN), a wireless wide area network (WWAN), and the like) or a wired network (e.g., an Ethernet network). Camera A/V sensors $100_1$ to $100n$, collectively referred to as camera A/V sensor 100 or camera A/V sensors 100, may, as described below, provide video and/or audio in real-time to emergency call center 106. A camera A/V sensor 100 may have a camera that can be rotated (e.g., camera A/V sensors $100_1$ and $100_n$ or have a fixed camera that cannot be rotated (e.g., camera A/V sensors $100_2$ and $100_3$). A camera A/V sensor may also include a microphone and/or a speaker.

The camera sensor control system 102 communicates with the camera A/V sensors 100 and the emergency call center 106 via a network interface 108. The camera sensor control system 102 has image/voice recognition circuitry 110 that receives the video from camera A/V sensors 100 and identifies gesture input events from the video and/or audio trigger words or sounds from the video. Video received from the camera A/V sensors 100 is stored in data storage system 114. The video received from the A/V camera sensors 100 and fetched from data storage 114 may be stored in storage 112.

Emergency call center 106 may be part of a public 911 call center of a region, city, county, etc. In other embodiments, emergency call center 106 may be a separate business that interacts with emergency services.

Figure 2A:
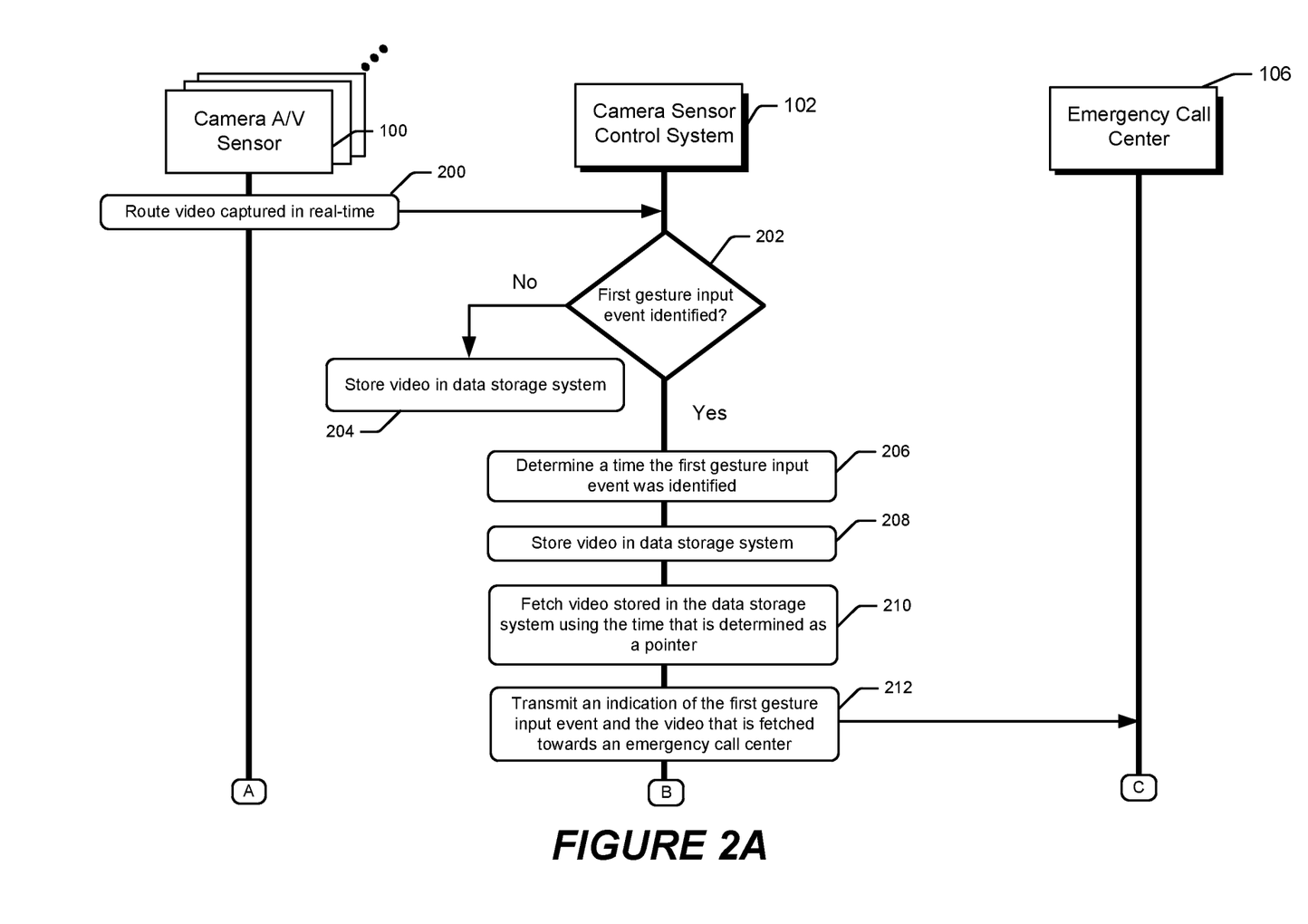
FIGS. 2A and 2B are exemplary signaling diagrams for illustrating procedures according to an embodiment.
Figure 2B:
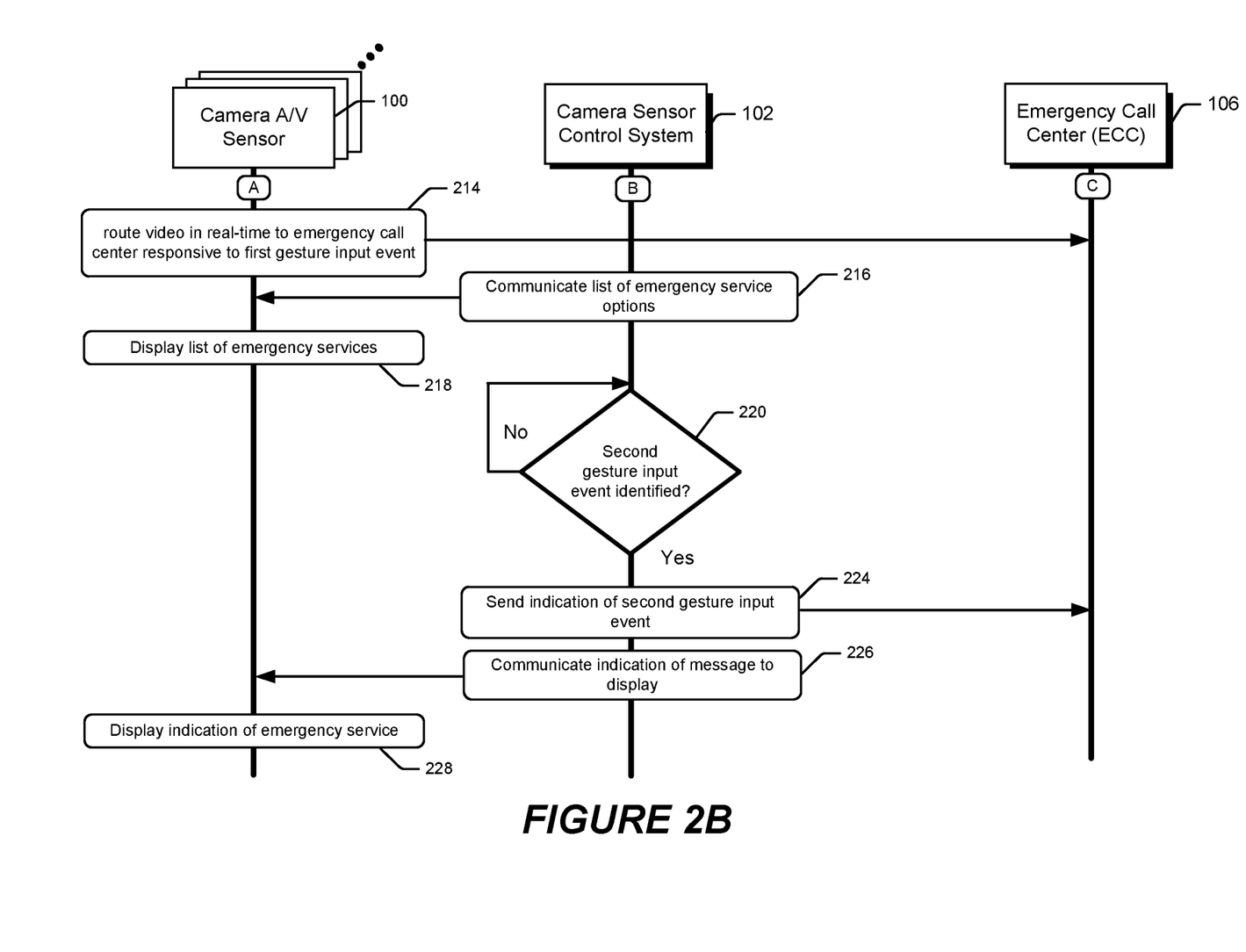

FIGS. 2A and 2B are signaling diagrams of an exemplary procedure that includes transmitting an indication of a gesture input event and video associated with the first gesture input event to an emergency call center 106. The gesture input event may indicate a request for help from police, fire, ambulance, etc. The procedure of FIGS. 2A and 2B involve the camera sensors 100, the camera sensor control system 102 and emergency call center 106.

Figure 3:
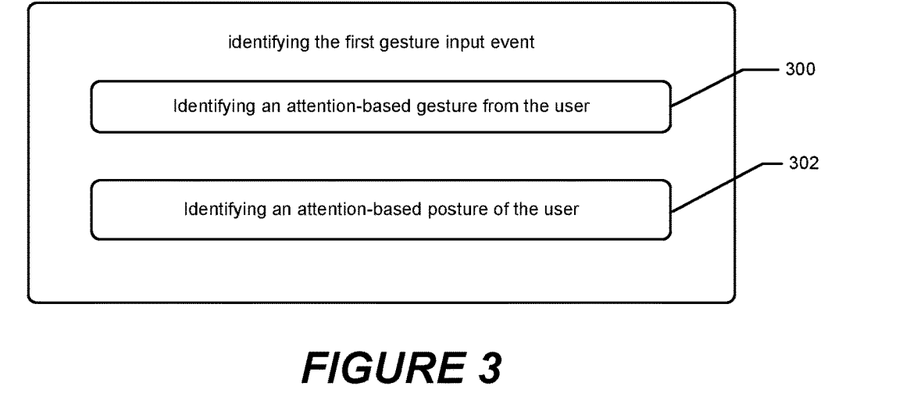
FIG. 3 is a flowchart illustrating operations to identify a first gesture input even according to an embodiment.

Initially, at operation 200, camera A/V sensors 100 route video captured in real time to the camera sensor control system 102. At operation 202, the camera sensor control system 102 identifies a gesture input event detected by one of the camera A/V sensors 100. Image recognition may be used to identify the gesture input event. Turning to FIG. 3, at operation 300, identifying the gesture input event may be identifying an attention-based gesture from the user. For example, a person waving their hands above his or her shoulder or above his or her head while facing the camera A/V sensor 100 may be considered an attention-based gesture. Other attention-based gestures may include a person jumping up and down, a person looking at a camera A/V sensor 100 and pointing one or both hands at some action that is happening or has happened, etc. At operation 302, the gesture input event may be identified as an attention-based posture of a person. For example, a person staring at the camera A/V sensor 100 for a period of time is an attention-based posture. Another attention-based posture may be a person looking back and forth between the camera A/V sensor 100 and at some action that is happening or has happened.

Returning to FIG. 2A, at operation 204, the video received from the camera A/V sensors 100 is stored in data storage system 114 when no gesture input event is identified. At operation 206, responsive to identifying the gesture input event, the time on the video where the gesture input event was identified is determined. At operation 208, the video is stored in data storage system 114.

At operation 210, video is fetched from the data storage system 114 system using the time that was determined as a pointer. The video that is fetched may include video prior to the time that was determined and from other camera A/V sensors 100.

Figure 4:
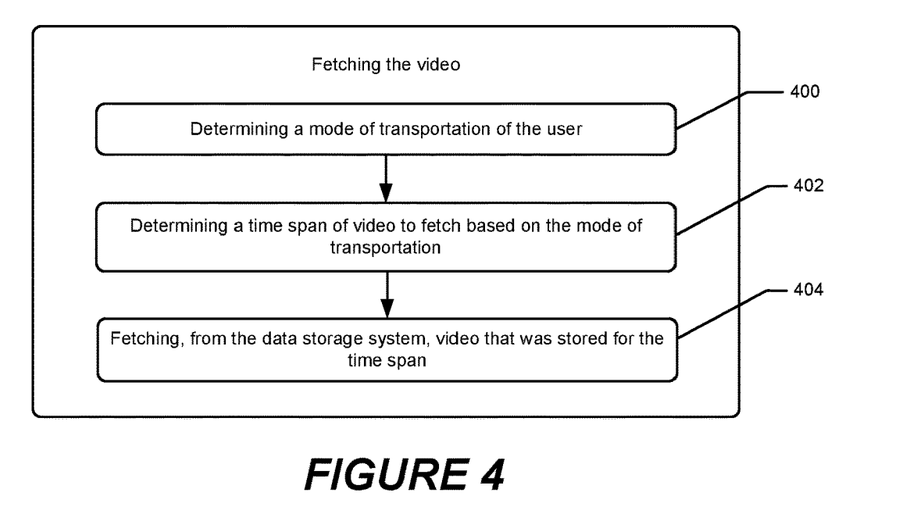
FIG. 4 is a flowchart illustrating operations to fetch stored video according to some embodiments.

Turning to FIG. 4, fetching the video in an embodiment includes determining a mode of transportation of the user that made the gesture input event at operation 400. For example, the mode of transportation may be that the user was walking, was driving a car, was a passenger on a bus, taxi, plane, or train, etc. A time span of video to fetch is determined at operation 402 based on the mode of transportation. For example, the time span for a person that was walking may be for a few minutes while the time span for other modes of transportation may be tens of minutes or longer.

Figure 5:
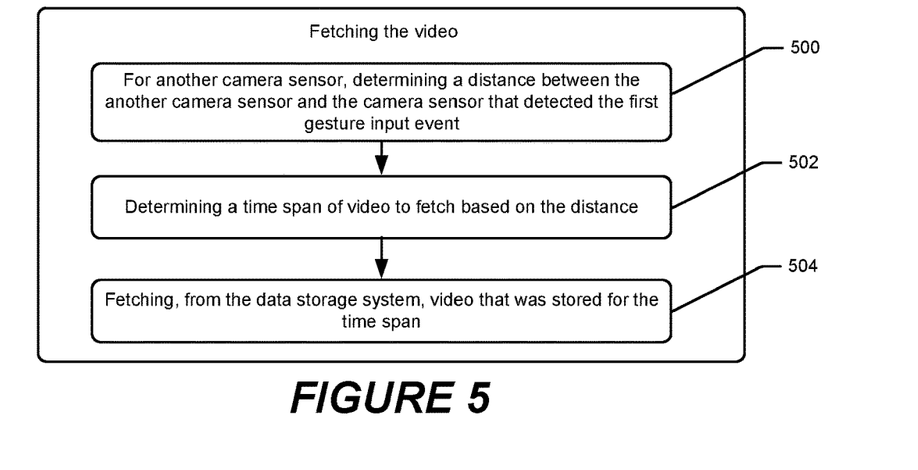
FIG. 5 is a flowchart illustrating operations to fetch stored video according to some embodiments.

FIG. 5 illustrates another embodiment of fetching the video. At operation 500, a distance between another camera A/V sensor 100 and the camera A/V sensor 100 that detected the gesture input is determined. A time span of video to fetch is determined based on the video at operation 502. For example, if the distance is several city blocks, then the time span may be longer than if the distance is a city block or less than a city block. The time span may be based on a default time span for various distances. At operation 504, video from the camera A/V sensor that detected the gesture input event that was stored for the time span is fetched from the data storage system.

Figure 6:
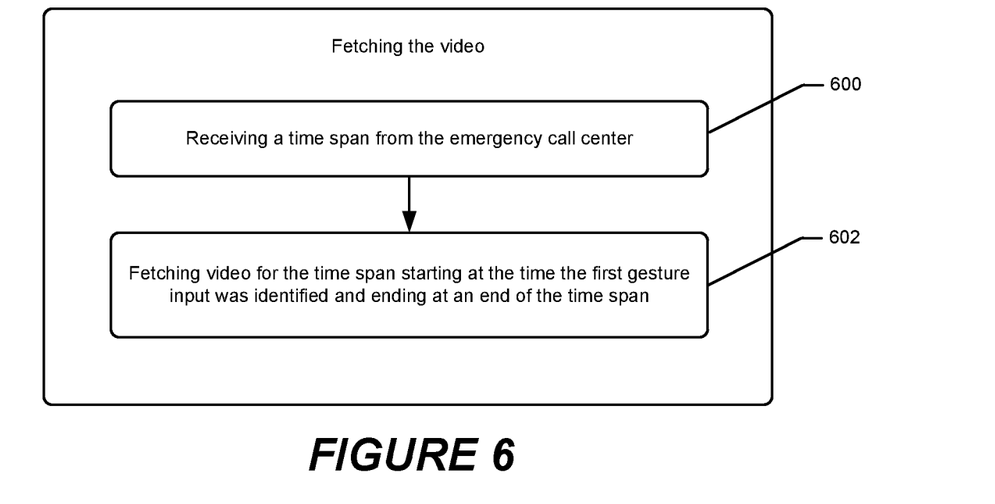
FIG. 6 is a flowchart illustrating operations to fetch stored video according to some embodiments.
Figure 7:
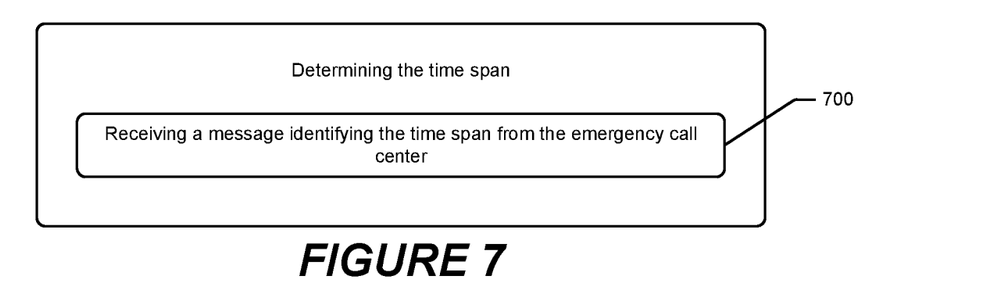
FIG. 7 is a flowchart illustrating operations to determine a time span according to some embodiments.

FIG. 6 illustrates another embodiment of fetching the video. At operation 600, a time span is received from the emergency call center 106. For example, at operation 700 of FIG. 7, the camera sensor control system 102 receives a message identifying the time span from the emergency call center 106. Returning to FIG. 6, at operation 602, video is fetched for the time span starting at the time the first gesture input was identified and ending at an end of the time span received from the emergency call center 106.

Figure 8:
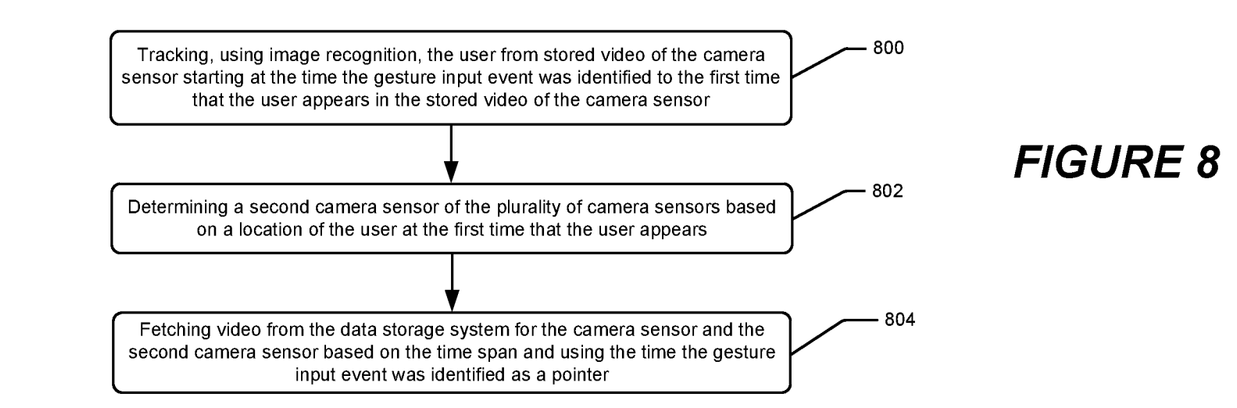
FIG. 8 is a flowchart illustrating operations to fetch stored video based on movement of a user prior to a gesture input event according to some embodiments.
Figure 9:
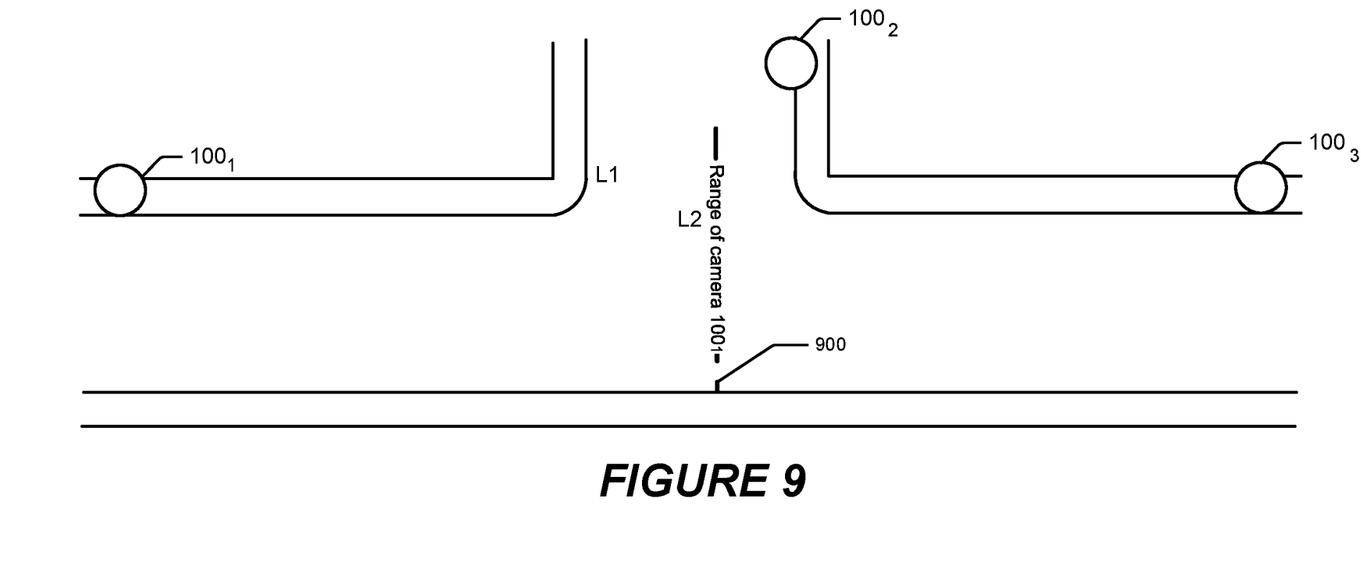
FIG. 9 is a block diagram illustrating a location of the user at the first time the user appears in the stored video of the camera sensor according to some embodiments.

FIG. 8 illustrates another embodiment of fetching the video. At operation 800, the user is tracked, using image recognition, from stored video of the camera A/V sensor 100 starting at the time the gesture input event was identified to the first time that the user appears in the stored video from the camera A/V sensor 100 that captured the video in which the gesture input event was identified. For example, FIG. 9 illustrates camera A/V sensors $100_1$, $100_2$, and $100_3$. The range of camera A/V sensor $100_1$ in a direction is illustrated at line 900. Location L1 represents a location where a user would first appear on camera A/V sensor $100_1$ when the user is walking (or driving) from the direction of camera A/V sensor $100_2$ and location L2 represents a location where a user would first appear on camera A/V sensor $100_1$ when the user is walking (or driving) from the direction of camera A/V sensor $100_3$.

Returning to FIG. 8, at operation 802, a second camera A/V sensor of the camera A/V sensors 100 is determined based on a location of the user at the first time the user appears. In the example illustrated in FIG. 9, the second camera A/V sensor would be camera A/V sensor $100_2$ when the location where a user would first appear on camera A/V sensor $100_1$ is location L1. The second camera A/V sensor would be camera A/V sensor $100_3$ when the location where a user would first appear on camera A/V sensor $100_1$ is location L2.

Returning to FIG. 8, at operation 804, video is fetched from the data storage system 114 from the video stored from the camera A/V sensor 100 that captured the video in which the gesture input event was identified and from the second camera A/V sensor 100 based on the time span and using the time the gesture input was identified as a pointer.

Figure 10:
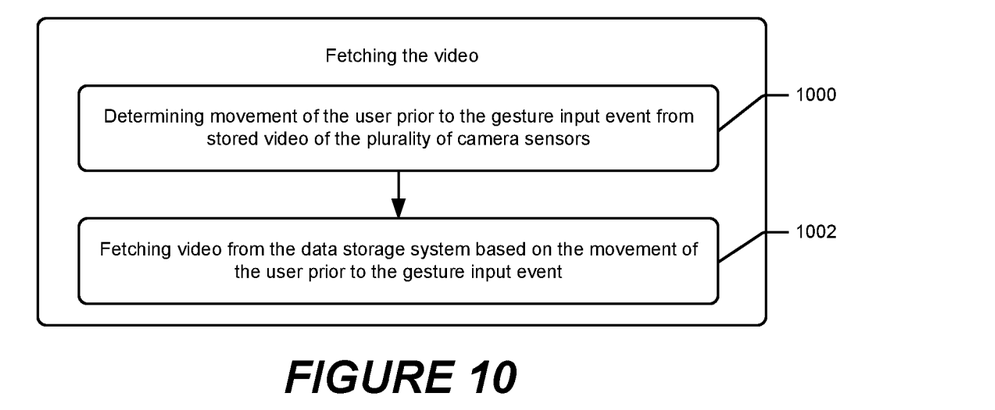
FIG. 10 is a flowchart illustrating operations to fetch stored video based on movement of a user prior to a gesture input event according to some embodiments.

FIG. 10 illustrates another embodiment of fetching the video. At operation 1000, movement of the user prior to the gesture input event is determined from stored video for the camera A/V sensor 100 that captured the video in which the gesture input event was identified. At operation 1002, video is fetched from the data storage system 114 based on the movement of the user prior to the gesture input event. For example, operations 800-804 may be performed by the camera sensor control system 102.

Returning to FIG. 2A, at operation 212, an indication of the first gesture input event and the video that was fetched is transmitted towards the emergency call center 106.

Turning to FIG. 2B, at operation 214, video is routed from the camera A/V sensor 100 that captured the video in with the gesture input was identified in real-time to the emergency call center 106. At operation 216, a list of emergency service options is communicated to the camera A/V sensor 100 that captured the video in which the gesture input event was identified.

Figure 11:
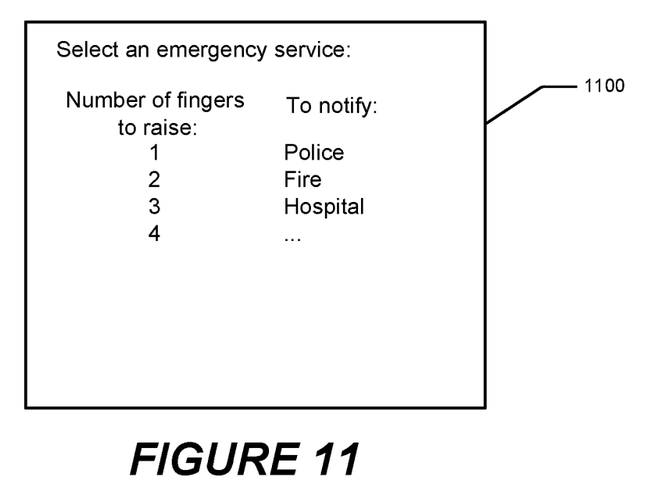
FIG. 11 is a block diagram illustrating a display of a list of emergency service options to be displayed by a display device that is located at a location the user can see according to some embodiments.

At operation 218, the list of emergency services is displayed. FIG. 11 illustrates an embodiment of a display 1100 that lists the emergency services. The display 1100 directs the user to raise a single finger to notify the police, raise two fingers to notify the fire department, three fingers to notify a hospital, etc.

Returning to FIG. 2B, at operation 220 the camera sensor control system 102 determines if a second gesture input event is identified in the video being received from the camera A/V sensor 100. For example, the image/voice recognition circuitry 110 identifies if the user raises a number of fingers in the video received from the camera A/V sensor 100.

At operation 224, if a second gesture input event is identified, the camera sensor control system 102 transmits an indication of the second gesture input event to the emergency call center 106. For example, the camera sensor control system 102 may transmit an indication of the number of fingers raised, an indication of which emergency service has been requested to be notified, etc.

Figure 12:
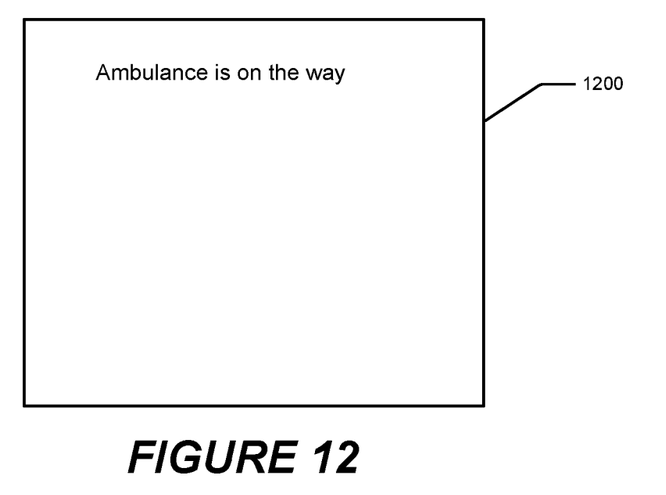
FIG. 12 is a block diagram illustrating a display message according to some embodiments.

At operation 226, the camera sensor control system 102 communicates an indication of a message to display responsive to the second gesture input event identified. At operation 228, the camera A/V sensor 100 displays an indication of the emergency service. An example of an indication of the emergency service displayed is illustrated in FIG. 12 where the indication displayed on display 1200 is a message that an ambulance is on the way. Other indications may indicate that police are on the way, that the fire department is on the way, etc.

Figure 13:
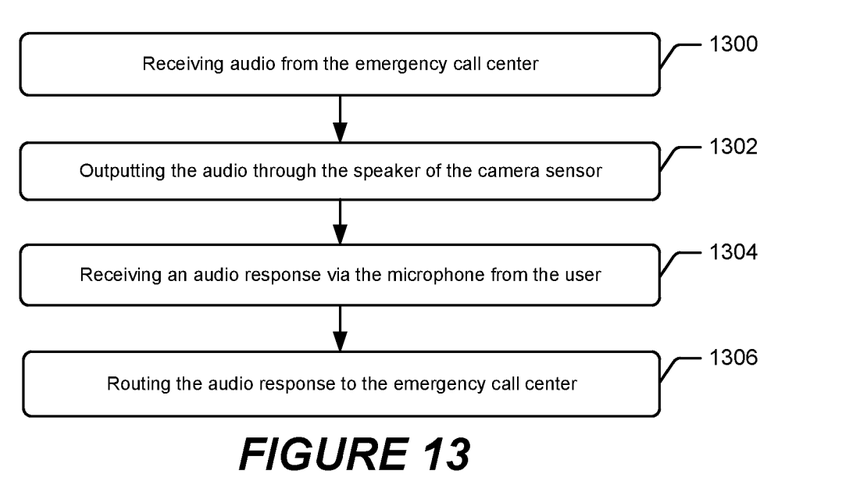
FIG. 13 is a flowchart illustrating operations to enable an emergency call center to communicate with a user according to some embodiments.

In some embodiments, a camera A/V sensor 100 may have a microphone and a speaker. In these embodiments, the microphone and speaker may be used to communicate with the user. Turning to FIG. 13, an embodiment is illustrated where the emergency call center 106 wants to communicate with the user.

At operation 1300, the camera sensor control system 102 receives audio from the emergency call center 106. For example, the emergency call center 106 may want to provide information or instructions to the user or ask for information from the user. At operation 1302, the camera sensor control system 102 outputs the audio received from the emergency call center 106 through the speaker of the camera A/V sensor 100 by transmitting the audio to the speaker of the camera A/V sensor 100.

At operation 1304, the camera sensor control system 102 receives an audio response from the user via the microphone of the camera A/V sensor 100. At operation 1306, the camera sensor control system 102 routes the audio response towards the emergency call center 106.

Figure 14:
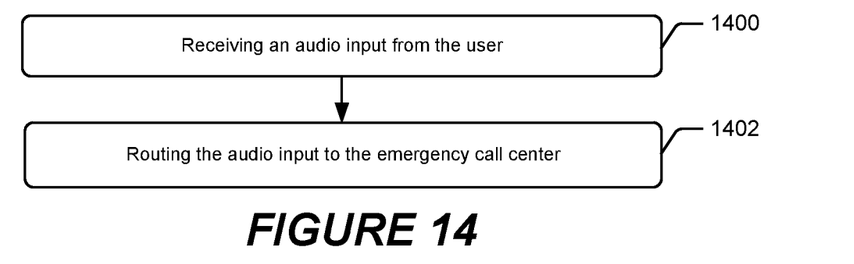
FIG. 14 is a flowchart illustrating operations to enable a user to communicate with an emergency call center according to some embodiments.

FIG. 14 illustrates an embodiment of using the microphone of the camera A/V sensor 100. For example, the user may want to provide information to the emergency call center 106 or ask for information from the emergency call center 106. At operation 1400, the camera sensor control system 102 receives an audio input from the user via the microphone. At operation 1402, the audio input from the user is routed to the emergency call center 106.

Figure 15:
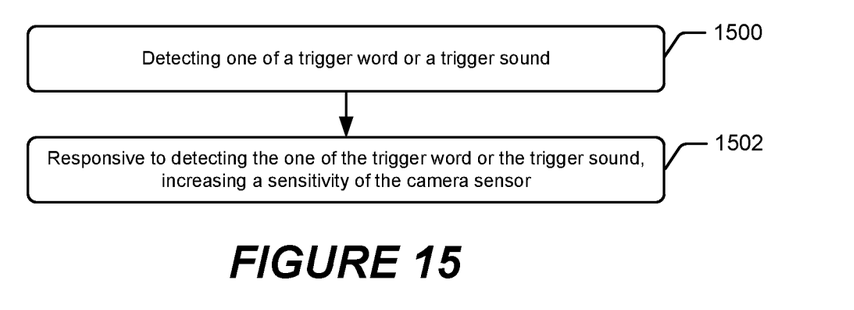
FIG. 15 is a flowchart illustrating operations to increase sensitivity of a camera sensor responsive to detecting a trigger word or trigger sound according to some embodiments.

FIG. 15 illustrates an embodiment of using the microphone to detect trigger words or sounds. For example, the camera sensor control system 102 may detect words like "help" or sounds like screams or gun shots. At operation 1500, the camera sensor control system 102 detects one of a trigger word or trigger sound. For example, the camera sensor control system 102 may compare the sounds received to trigger words and trigger sounds. For example, gun shots and screams may each exhibit a particular frequency spectrum. Detection of one of these particular frequency spectrums may indicate a gun shot or scream was picked up by the microphone. Other frequency spectrums may indicate other sounds or words.

At operation 1502, a sensitivity of the camera A/V sensor 100 is increased responsive to detecting the trigger word or sound. For example, users may not have to raise their hands as high when a trigger word such as "help" is heard or be looking at the camera A/V sensor 100 for the camera sensor control system 102 to identify a gesture input event.

Figure 16:
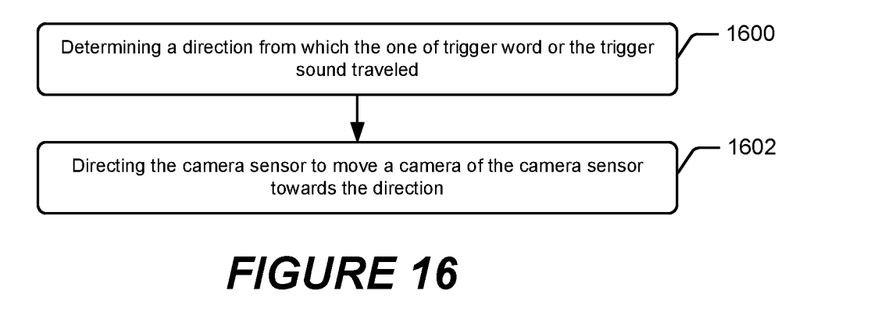
FIG. 16 is a flowchart illustrating operations to direct a camera sensor to move a camera of the camera sensor towards a direction from which a trigger word or a trigger sound traveled according to some embodiments.

Turning to FIG. 16, the microphone that detects trigger words or trigger sounds may be sensitive enough to detect the direction the trigger sound or trigger word traveled. At operation 1600, a direction from which the trigger word or trigger sound traveled is determined. At operation 1602, responsive to the camera A/V sensor 100 has a moveable camera, the camera sensor control system 102 directs the camera A/V sensor 100 to move the camera of the camera A/V sensor to move towards the direction from which the trigger word or trigger sound traveled. This allows the camera sensor control system 102 or the emergency call center 106 to identify events that are occurring in the direction from which the trigger word or trigger sound traveled. Steps 202 to 228 of FIGS. 2A and 2B may then be performed with the camera pointing in the direction from which the trigger word or trigger sound traveled. Additionally, an indication of the trigger word or trigger sound may be sent to the emergency call center 106 along with video associated with the trigger word or trigger sound.

Figure 17:
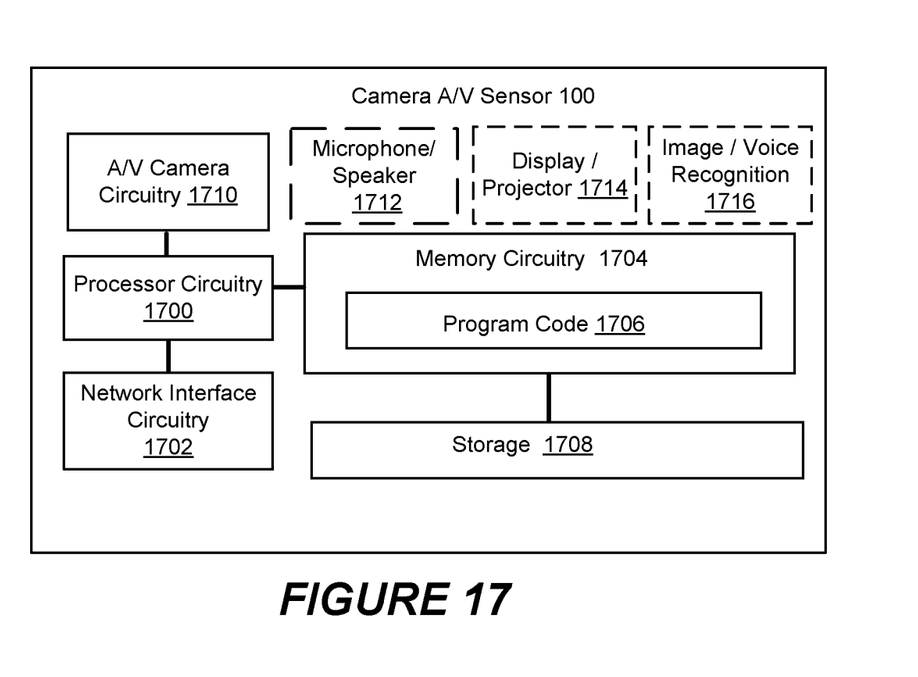
FIG. 17 is a block diagram of a camera sensor according to some embodiments.

FIG. 17 provides an overview diagram of a suitable computer hardware and computing environment in conjunction with which various embodiments of the camera A/V sensor 100 may be practiced. The description of FIG. 17 is intended to provide a brief, general description in conjunction with which the subject matter described herein may be implemented that provides improvements in automated identification of an event that requires an emergency service. In some embodiments, the subject matter is described in the general context of computer-executable instructions, such as program modules, being executed by a computer, such as a personal computer that provide the improvements described above. Generally, program modules include routines, programs, objects, components, data structures, and the like, that perform particular functions described above. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 17, a hardware and operating environment is provided that is applicable to the camera A/V sensor 100 shown in the other figures. As shown in FIG. 17, one embodiment of the hardware and operating environment includes processing circuitry 1700 having one or more processing units coupled to the network interface circuitry 1702 and a memory circuitry 1704. The memory circuitry 1704 may include a ROM, e.g., a flash ROM, a RAM, e.g., a DRAM or SRAM, or the like and includes suitably configured program code 1706 to be executed by the processing circuitry so as to implement the above described functionalities of the camera A/V sensor 100. The storage 1708 may include a mass storage, e.g., a hard disk or solid-state disk, or the like. The storage 1708 may temporarily store video captured by the camera A/V sensor 100. There may be only one or more than one processing unit, such that the processor circuitry 1700 comprises a single central-processing unit (CPU), or a plurality of processing units, commonly referred to as a multiprocessor or parallel-processor environment. A multiprocessor system can include cloud computing environments.

The camera A/V sensor 100 has an A/V camera circuitry 1710 that implements the camera functions described above such as producing the video routed to the camera sensor control system 102. The camera A/V sensor 100 may have a microphone/speaker 1712 that outputs audio received from the camera sensor control system 102 and receives audio inputs from the location of the camera A/V sensor 100 such as user audio input, trigger sounds, etc.

The camera A/V sensor 100 may, in some embodiments, have display/projector circuitry 1714 that displays the list of emergency services and the indication of the emergency service on a display screen. Alternatively, the display/projector circuitry 1714 may display the list of emergency services and the indication of the emergency services by projecting the list and indication on a wall, on a sidewalk, or on a street, etc.

The camera A/V sensor 100 may, in some embodiments, have image/voice recognition circuitry that performs some of the image/voice recognition described above. For example, manufacturers of the camera A/V sensors 100 may implement the image/voice recognition in newer models to distinguish themselves over other manufacturers.

In some embodiments, the camera sensor control system 102 may be configured to identify the user and store the information about the user for future reference in storage 112. The camera sensor control system 102 may identify the user by accessing, for example, department of motor vehicles (DMV) databases, social security databases, government databases, etc.

Figure 18:
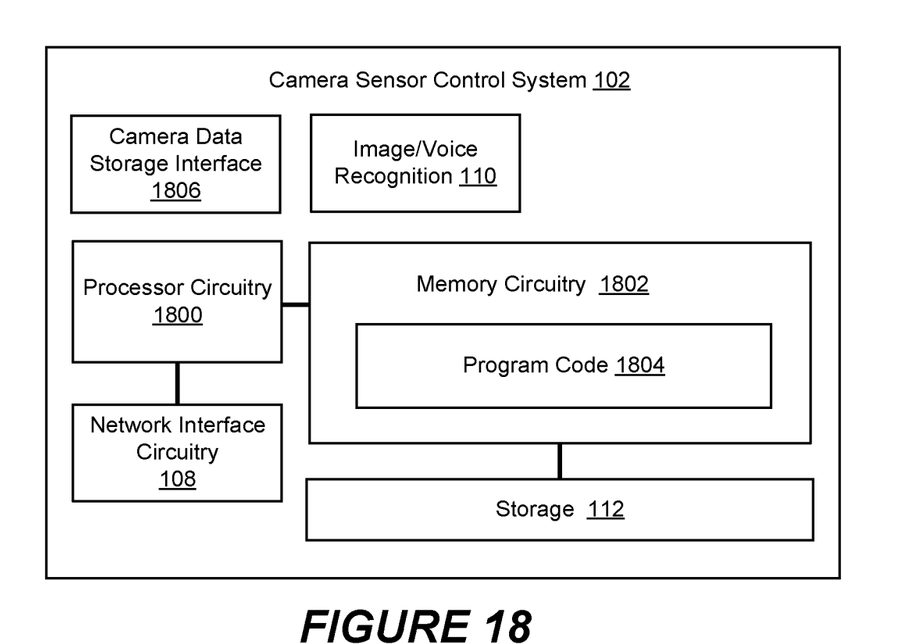
FIG. 18 is a block diagram of a camera sensor control system according to some embodiments.

FIG. 18 provides an overview diagram of a suitable computer hardware and computing environment in conjunction with which various embodiments of camera sensor control system 102 may be practiced. The description of FIG. 18 is intended to provide a brief, general description in conjunction with which the subject matter may be implemented. In some embodiments, the subject matter is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 18, a hardware and operating environment is provided that is applicable to the camera sensor control system 102 described in the other figures and described above. Moreover, those skilled in the art will appreciate that the subject matter may be practiced with other computer system configurations, including handheld devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 18, a hardware and operating environment is provided that is applicable to the camera sensor control system 102 shown in the other figures. As shown in FIG. 18, one embodiment of the hardware and operating environment includes processing circuitry 1800 having one or more processing units coupled to the network interface circuitry 108 and a memory circuitry 1802. The memory circuitry 1802 may include a ROM, e.g., a flash ROM, a RAM, e.g., a DRAM or SRAM, or the like and includes suitably configured program code 1804 to be executed by the processing circuitry so as to implement the above described functionalities of the camera sensor control system 102. The storage 112 may include a mass storage, e.g., a hard disk or solid-state disk, or the like. There may be only one or more than one processing unit, such that the processor circuitry 1800 of camera sensor control system 102 comprises a single central-processing unit (CPU), or a plurality of processing units, commonly referred to as a multiprocessor or parallel-processor environment. A multiprocessor system can include cloud computing environments.

The camera sensor control system 102 has image/voice recognition circuitry 110 that provides the image recognition functions (e.g., identifying the gesture input events) and voice recognition functions (e.g., outputting audio and detecting audio, including detecting trigger words and trigger sounds) describes above. The camera sensor control system 102 may have a separate camera data storage interface 1806 that is used to route video to the data storage system 114 and fetch video from the data storage system 114.

Thus, example systems, methods, and non-transitory machine readable media for identifying gesture inputs and requesting emergency services have been described. The advantages provided include transmitting an indication that emergency services are needed when cellular service is overwhelmed by the number of uses at particular locations, reducing the time to contact emergency services, enabling contact of emergency services by users who do not have wireless devices, fetching and providing video associated with the time a gesture event is identified that emergency services are needed, and transmitting an indication that emergency services responsive to identifying trigger words or trigger sounds. The advantages result in improved automated identification of an event that requires an emergency service.

The subject matter described herein may also be used in other embodiments. For example, a toddler who has her own room can be taught to "call" her parents by staring at a camera A/V sensor placed in the toddler's room. In such an embodiment, the camera sensor control system sends the indications to the parent's cell phone or landline phone instead of the emergency call center. In other embodiments, a nanny or babysitter can place an emergency call by gesturing or staring at a camera A/V sensor or speaking trigger words or outputting trigger sounds as described herein. Similarly, a patient in a hospital room may contact a doctor or nurse by gesturing or staring at a camera A/V sensor or speaking trigger words or outputting trigger sounds as described herein.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object-oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method by a computer of a computing system having a plurality of camera sensors, the method comprising:
   identifying a first gesture input event detected by a camera sensor of the plurality of camera sensors, each camera sensor routing video captured by the camera sensor to a data storage system, the first gesture input event being identified as corresponding to a defined attention-based gesture performed by a user;
   determining a time the first gesture input event was identified;
   fetching video stored in the data storage system using the time that is determined as a pointer;
   transmitting an indication of the first gesture input event and the video that is fetched towards an emergency call center.

2. The method of claim 1 further comprising:
   communicating, by the computing system, a list of emergency service options to be displayed by a display device that is located at a location the user can see, wherein the list comprises a plurality of emergency types, wherein each emergency type corresponds to different one of a plurality of service-selection gestures;
   wherein the first gesture input event corresponds to the user performing one of the plurality of service-selection gestures, and
   identifying a second gesture input event responsive to the user performing another one of the service-selection gestures.

3. The method of claim 2 wherein different gesture input events are identified as having performed by a user showing different numbers of fingers to the camera sensor.

4. The method of claim 2 further comprising:
   responsive to identifying the second gesture input event, sending an indication of the second gesture input event to the emergency call center, wherein when the second gesture event is identified within a threshold time of the first gesture input event, not fetching video from the data storage system.

5. The method of claim 1 wherein fetching the video comprises:
  determining a mode of transportation of the user;
  determining a time span of video to fetch based on the mode of transportation; and
  fetching, from the data storage system, video that was stored for the time span.

6. The method of claim 5, wherein determining the time span comprises receiving a message identifying the time span from the emergency call center.

7. The method of claim 5, wherein fetching video further comprises:
  for another camera sensor, determining a distance between the another camera sensor and the camera sensor that detected the first gesture input event;
  determining a time span of video to fetch based on the distance; and
  fetching, from the data storage system, video that was stored for the time span.

8. The method of claim 1 further comprising:
  responsive to identifying the first gesture input event, routing real-time camera data from the camera sensor to the emergency call center.

9. The method of claim 1, wherein the camera sensor comprises a microphone and a speaker, the method further comprising:
  receiving audio from the emergency call center; and
  outputting the audio through the speaker of the camera sensor.

10. The method of claim 9, further comprising:
  receiving an audio response via the microphone from the user;
  routing the audio response to the emergency call center.

11. A camera sensor control system in communication with a plurality of camera sensors and an emergency call center, the camera sensor control comprising:
  a communication interface;
  a processor coupled to the communication interface and to memory, wherein the memory stores computer program instructions that are executed by the processor to perform operations comprising:
    identifying a gesture input event in video detected by a camera sensor of the plurality of camera sensors, the gesture input event being identified as corresponding to a defined attention-based gesture from a user;
    determining a time the gesture input event was identified;
    fetching video stored in a data storage system using the time that is determined as a pointer;
    transmitting, via the communication interface though a network, an indication of the gesture input event and the video that is fetched towards an emergency call center.

12. The camera sensor control system of claim 11, wherein the operations further comprise:
  storing video received from the camera sensor in the data storage system; and
  storing video received from other camera sensors of the plurality of camera sensors in the data storage system.

13. The camera sensor control system of claim 11 wherein the camera sensor comprises a microphone, the operations further comprising detecting one of a trigger word or a trigger sound.

14. The camera sensor control system of claim 13 further comprising:
  responsive to identifying the one of the trigger word or the trigger sound, increasing a sensitivity of the camera sensor.

15. The camera sensor control system of claim 13, further comprising:
  determining a direction from which the one of the trigger word or the trigger sound traveled; and
  directing the camera sensor to move a camera of the camera sensor towards the direction.

16. The camera sensor control system of claim 11 wherein the gesture input is further identified as corresponding to a defined attention-based posture of the user.

17. The camera sensor control system of claim 11 wherein fetching the video stored in the data storage system based on the time comprises:
  receiving a time span from the emergency call center; and
  wherein fetching the video stored in a data storage system based on the time comprises fetching video for the time span starting at the time the first gesture input was identified and ending at an end of the time span.

18. The camera sensor control system of claim 11 wherein fetching the video stored in a data storage system based on the time comprises:
  determining a mode of transportation of the user;
  determining a time span of video to fetch based on the mode of transportation; and
  fetching, from the data storage system, video for the time span.

19. The camera sensor control system of claim 18 wherein fetching video for the time span further comprises:
  determining movement of the user prior to the gesture input event from stored video of the plurality of camera sensors,
  wherein fetching the video from the data storage system further comprises fetching video from the data storage system based on the movement of the user prior to the gesture input event.

20. The camera sensor control system of claim 19,
  wherein determining movement of the user comprises:
    tracking, using image recognition, the user from stored video of the camera sensor starting at the time the gesture input event was identified to a first time that the user appears in the stored video of the camera sensor;
    determining a second camera sensor of the plurality of camera sensors based on a location of the user at the first time that user appears; and
  wherein fetching the video comprise fetching video from the data storage system comprises fetching video for the camera sensor and the second camera sensor based on the time span and using the time the gesture input event was identified as a pointer.

* * * * *